United States Patent
Jiang

(10) Patent No.: US 10,721,613 B2
(45) Date of Patent: Jul. 21, 2020

(54) CONNECTION MANAGEMENT SYSTEM FOR ELECTRONIC SIM CARD TERMINALS, USER TERMINALS AND APPLICATIONS

(71) Applicant: Shenzhen Jetlink Technology Co., Ltd, Shenzhen (CN)

(72) Inventor: Ming Jiang, Beijing (CN)

(73) Assignee: SHENZHEN JETLINK TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 16/377,675

(22) Filed: Apr. 8, 2019

(65) Prior Publication Data

US 2020/0068383 A1    Feb. 27, 2020

(30) Foreign Application Priority Data

Aug. 27, 2018   (CN) .......................... 2018 1 0981011

(51) Int. Cl.
*H04B 1/38*      (2015.01)
*H04W 8/18*      (2009.01)
(Continued)

(52) U.S. Cl.
CPC .......... *H04W 8/183* (2013.01); *H04B 1/3816* (2013.01); *H04W 8/205* (2013.01); *H04W 60/00* (2013.01); *H04W 84/042* (2013.01)

(58) Field of Classification Search
None
See application file for complete search history.

(56) References Cited

U.S. PATENT DOCUMENTS

2003/0210680 A1* 11/2003 Rao ...................... H04L 41/147
                                                              370/352
2011/0306318 A1* 12/2011 Rodgers ................ H04W 8/183
                                                              455/410

(Continued)

FOREIGN PATENT DOCUMENTS

CN          103458004 A       12/2013
CN          104902463 A        9/2015
(Continued)

*Primary Examiner* — Suhail Khan
(74) *Attorney, Agent, or Firm* — Volpe and Koenig, P.C.

(57) ABSTRACT

A connection management system for electronic SIM card terminals, a user terminal and an application, and belongs to the technical field of network connections for electronic SIM card terminals. The connection management system comprises a connection management module, a baseband processing module and a connection management server module. The connection management module randomly selects one preset operator Profile X from a plurality of pre-stored preset operator profiles, the baseband processing module establishes a temporary connection channel between the connection management module and a cellular network via Profile X, the connection management module applies for a local Profile A to the connection management server module and downloads the local Profile A from the connection management server module via the temporary connection channel, and the baseband processing module establishes a cellular data connection channel with the cellular network via Profile A. The present invention improves the global cellular data connectivity of terminals.

13 Claims, 5 Drawing Sheets

(51) Int. Cl.
*H04B 1/3816* (2015.01)
*H04W 8/20* (2009.01)
*H04W 60/00* (2009.01)
*H04W 84/04* (2009.01)

(56) References Cited

U.S. PATENT DOCUMENTS

| | | | |
|---|---|---|---|
| 2015/0349825 A1* | 12/2015 | Lee | H04W 8/205 |
| | | | 455/558 |
| 2016/0173156 A1* | 6/2016 | Wane | H04W 4/50 |
| | | | 455/558 |
| 2016/0246611 A1 | 8/2016 | Li et al. | |
| 2017/0155507 A1 | 6/2017 | Park et al. | |

FOREIGN PATENT DOCUMENTS

| | | |
|---|---|---|
| CN | 105916134 A | 8/2016 |
| CN | 106537961 A | 3/2017 |
| CN | 106937274 A | 7/2017 |

* cited by examiner

CONNECTION MANAGEMENT SYSTEM FOR ELECTRONIC SIM CARD TERMINALS, USER TERMINALS AND APPLICATIONS

CROSS REFERENCE TO RELATED APPLICATIONS

This application claims priority to Chinese Application No. 201810981011.0, filed on Aug. 27, 2018, entitled "Connection Management System For Electronic Sim Card Terminals, User Terminals And Applications", which is specifically and entirely incorporated by reference.

TECHNICAL FIELD

The present invention relates to network connection techniques for electronic SIM card terminals, in particular to a connection management system for electronic SIM card terminals, a user terminal and an application.

DESCRIPTION OF RELATED ART

Electronic SIM cards can replace traditional pluggable solid SIM cards with software, are remotely downloaded into terminals (embedded UICC cards or software modules) through electronic cards, and are then activated to be used to fulfill the functions of the traditional pluggable SIM cards, and in this way, mobile terminals can still be connected to a cellular network without the pluggable SIM cards.

As the SIM cards for trans-regional mobile communication products are arranged in terminals in the form of UICC cards, the connectivity of the terminals to the cellular network and applications based on the cellular network such as remote diagnosis and personal entertainment shall be tested in the production test. After being sold in a certain region, the SIM cards should be switched to profiles of the local operator in this region, so that by adoption of the embedded SIM (eSIM) technique, another operator can be selected according to the corresponding nation, region, user preferences and network deployment and an operator profile corresponding to this operator can be downloaded to the embedded UICC cards on the terminals when or after the mobile communication products are sold to terminal users, and then the operator profile is activated to be used.

The International Standard Organization GSMA defines two eSIM remote management technical standards for the implementation of remote management of electronic cards: the first technical standard is SGP.01/02 which is a top-down background-triggered remote management technique for embedded UICC cards for M2M and is designed in such a manner that a unique operator profile is preset in each embedded UICC card and binds with a specified server; the second technical standard is SGP.21/22 which is a bottom-up terminal-triggered eSIM remote management technique for SIM remote management of Consumer Electronics.

These two eSIM remote management technical standards mentioned above both have certain drawbacks, in particular:

The first technical standard SGP.01/02 defines the preset operator profile, but as such preset operator profile corresponds to a unique preset number, the following problems may be caused:

(1) There are a huge number of Internet of Things terminals, so severe number waste (IMSI, MSISDN and ICCD) will be caused by presetting one independent activated operator profile in each card or terminal.

(2) In order to preset a unique available number in each terminal or card, the workload on the production line is increased, and the production cost is also increased.

(3) These numbers need to be activated, which means that these numbers should be put into operation on the network side to make sure that terminals with these numbers can be connected to the cellular network; the operators providing these preset numbers calculate the cost of network equipment according to the number of activated users and the user capacity, the cost of the operators will be increased with the increase of the number of the preset numbers, and the extra cost will be transferred to downstream consumers using these preset numbers.

(4) The preset number defined by SGP.01/02 needs to bind with a certain SM-SR (eSIM platform), which affects the flexibility.

The second technical standard SGP.21/22 does not yet clearly define the technical scheme of presetting operator profiles.

The two standards only fulfill the eSIM remote management function and can achieve the electronic card function only on embedded UICC cards, but none of the two standards provides a mobile connection management service suitable for both mobile communication terminals and applications or provides a mobile connection management service for mobile communication terminals and applications having global connectivity requirements.

SUMMARY OF THE INVENTION

The objective of embodiments of the present invention is to provide a connection management system for electronic SIM card terminals, a user terminal and an application so as to provide connectivity as a service (CaaS) for applications having the requirement to connect to the global cellular network.

The present invention provides a connection management system for electronic SIM card terminals, comprising: a connection management module used to randomly select one preset operator Profile X from a plurality of pre-stored preset operator profiles; a baseband processing module used to establish a temporary connection channel between the connection management module and a cellular network via the Profile X; and a connection management server module, wherein the connection management module applies for a local operator Profile A from the connection management server module and downloads the local operator Profile A from the connection management server module via the temporary connection channel; and wherein the baseband processing module is further used to establish a cellular data connection channel with the cellular network via Profile A.

Optionally, the system may further comprise a terminal application module used to access an application server via the cellular data connection channel.

Optionally, the baseband processing module may be further used to establish a formal cellular data connection channel with the cellular network via Profile A by the steps of: instructing, via the connection management module, the baseband processing module to attach to the network via Profile A after Profile A is downloaded; and establishing the cellular data connection channel if the baseband processing module successfully attaches to the network via Profile A; wherein, the connection management module is further used to send a Profile A activation and usage message to the connection management server module to inform the connection management server module that the baseband processing module has attached to the network via Profile A.

Optionally, the connection management server module may be further used to switch the network state after receiving the Profile A activation and usage message and to send an activation confirmation message to the connection management module after switching the network state; the connection management module is further used to download another Profile A if it does not receive the activation confirmation message from the connection management server module within a first preset time after sending the Profile A activation and usage message to the connection management server module.

Optionally, the connection management module may be further used to select another Profile X if it does not receive an activation confirmation message from the connection management server module within a second preset time after selecting the Profile X.

Optionally, the baseband processing module may be further used to send a feedback message to the connection management module on the condition that the temporary connection channel is established; and the connection management module may be further used to select another Profile X if it does not receive the feedback message from the baseband processing module within a third preset time after selecting Profile X.

Optionally, the system may further comprise an operator charging module used to measure a traffic of the terminal application module accessing the application server.

Optionally, the connection management server module may be further used to send a traffic application message to the operator charging module before sending an activation confirmation message to the connection management module; wherein, the operator charging module allocates a first traffic according to the traffic application message and sends an allocation feedback message to the connection management server module, and the connection management server module sends the activation confirmation message to the connection management module according to the allocation feedback message.

Optionally, the operator charging module may be further used to send a 'to be used up' notification to the connection management module via the connection management server when the difference between the measured traffic consumption and the first traffic is smaller than a preset traffic threshold.

Optionally, the connection management module may be further used to forward the 'to be used up' notification to the terminal application module so as to apply for a second traffic or to activate the Profile A according to a usage feedback message of the terminal application module.

Optionally, the first traffic and the second traffic may be time and/or flow.

Optionally, the electronic SIM card may include a virtual SIM card and an embedded SIM card.

The present invention further provides a user terminal, comprising the connection management system for electronic SIM card terminals according to the present invention.

The present invention further provides an application, comprising the connection management system for electronic SIM card terminals according to the present invention.

According to the technical solution, the connection management module randomly selects a preset operator profile, and if the selected preset operator profile is available, the connection management module is permitted to download a local operator profile from the connection management server module so as to establish a cellular data connection channel with the connection management server module via the local operator profile. Compared with the technique that one unique operator profile is preset in each terminal, the cost of the operator profiles is reduced, the connectivity of the terminals to the global cellular network is improved, and the technical solution is very practical for the terminals.

Other characteristics and advantages of the embodiments of the present invention are expounded in the subsequent detailed description of the invention.

BRIEF DESCRIPTION OF THE DRAWINGS

The accompanying drawings are provided for a better understanding of the embodiments of the present invention, belong to one part of the specification and are used to explain the embodiments of the present invention together with the following specific implementation, but these accompanying drawings are not intended to limit the embodiments of the present invention. Particularly.

DETAILED DESCRIPTION OF THE INVENTION

The embodiments of the present invention will be expounded below with reference to the accompanying drawings. It should be understood that the embodiments described herein are only used to illustrate and explain the examples of the present invention, but is not intended to limit the examples of the present invention.

Figure 1:
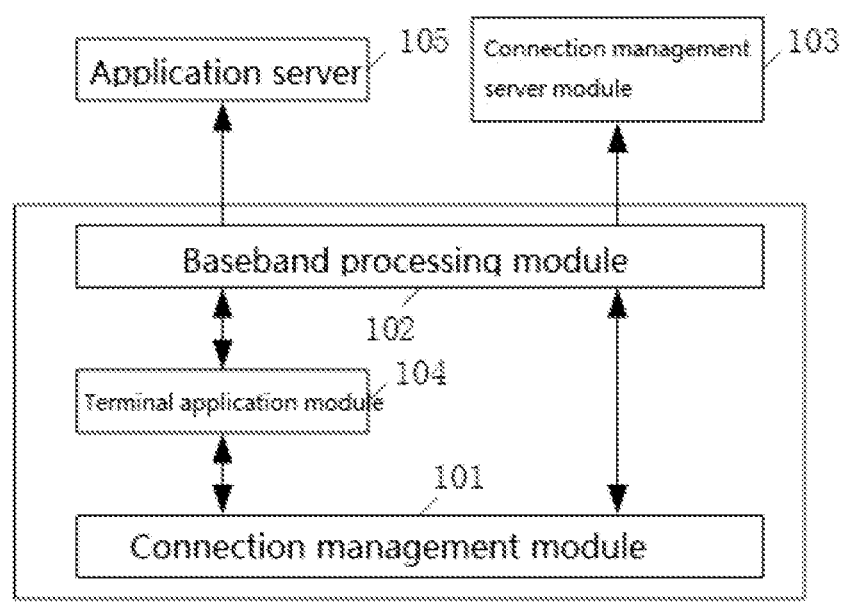
FIG. 1 is block diagram illustrating the connection management system for electronic SIM card terminals of the present invention.

FIG. 1 is a block diagram illustrating the connection management system for electronic SIM card terminals of the present invention. As shown in FIG. 1, the connection management system for electronic SIM card terminals comprises a connection management module 101, a baseband processing module 102 and a connection management server module 103. The connection management module 101 is used to randomly select one preset operator Profile X from a plurality of pre-stored preset operator profiles. The baseband processing module 102 is used to establish a temporary connection channel between the connection management module 101 and a cellular network via the Profile X. The connection management module 101 applies for a local operator Profile A to the connection management server module 103 and then downloads the local operator Profile A from the connection management server module 103 via the temporary connection channel, wherein the baseband processing module 102 establishes a cellular data connection channel with the cellular network via the Profile A.

A plurality of preset operator profiles are stored in the connection management module 101, for instance, n preset operator profiles, namely Profile 1, Profile 2, . . . , and Profile n, are stored in the connection management module 101. These preset operator profiles are pre-written into the connection management module 101 when user terminals are produced or applications are generated, and the technique for writing the preset operator profiles into the connection management module 101 is common knowledge in the art and will not be detailedly described herein. These preset operator profiles can log in to the cellular network globally, namely these preset operator profiles have signed data roaming. The technique for global roaming signing of the operator profiles is common knowledge in the art and will not be detailedly described herein. What needs to be pointed out is that because it incurs cost to preset the operator profiles and the number of the preset operator profiles is limited, the number of the preset operator profiles is smaller than the total number of produced user terminals, for instance, maybe only 50 operator profiles need to be preset for 10,000 user terminals. In other words, unlike the prior art, one terminal does not need to correspond to one preset operator profile anymore, and the connection management module 101 of any one of the 10,000 terminals can randomly select one preset operator profile from the 50 preset operator profiles when needed. In the present invention, the preset operator profile randomly selected via the connection management module 101 is marked as Profile X.

When a user terminal is turned on or a terminal application initializes a request to activate a mobile communication network, the connection management module 101 selects Profile X and then instructs the baseband processing module 102 to attach to the network via Profile X, the baseband processing module 102 then attaches to the network via Profile X by following the instruction to establish a temporary connection channel via Profile X, and then the connection management module 101 is permitted to apply for a local Profile to the connection management server module 103 and downloads the local Profile from the connection management server module 103 via the temporary connection channel. Particularly, after attaching to the network via Profile X, the baseband processing module 102 sends a feedback message (such as OK), indicating that the temporary connection channel has been successfully established, to the connection management module 101, and then the local Profile is applied by the connection management module 101 and downloaded from the connection management server module 103. In the present invention, the local Profile is marked as Profile A. It should be understood that the cellular data connection channel established by the baseband processing module 102 with the cellular network via Profile A is actually a cellular data connection channel established between the terminal side and the cellular network.

The specific process for the connection management module 101 to download Profile A is as follows: the connection management module 101 sends a request to apply for Profile A to the connection management server module 103, the connection management server module 103 allocates Profile A according to the request to apply for Profile A and sends the allocated Profile A to the connection management module 101. It should be understood that the connection management module 101 applies for Profile A to the connection management server module 103 and downloads Profile A from the connection management server module 103 via the temporary connection channel.

As shown in FIG. 1, the connection management system for electronic SIM card terminals may further comprise a terminal application module 104 used to access an application server 105 via the cellular data connection channel.

Those skilled in this field would appreciate that the ultimate aim of establishing a connection between the connection management module 101 and the connection management server module 103 is to establish a connection between a terminal application and the application server 105 so that the terminal application can access the application server 105. The terminal application module 104 accesses the application server 105 via the cellular data connection channel, actually via the baseband processing module 102.

In FIG. 1, the connection management module 101, the baseband processing module 102 and the terminal application module 104 are located on the terminal side.

The baseband processing module 102 establishes the cellular data connection channel with the cellular network via Profile A through the following steps: after downloading Profile A, the connection management module 101 instructs the baseband processing module 102 to attach to the network via Profile A, and then the cellular data connection channel is established if the baseband processing module 102 successfully attaches to the network via Profile A, wherein the connection management module 101 is further used to send a Profile A activation and usage message to the connection management server module 103 to inform the connection management server module 103 that the baseband processing module 102 has attached to the network via Profile A.

The specific process for the baseband processing module 102 to establish the cellular data connection channel with the cellular network via Profile A is as follows: after downloading Profile A, the connection management module 101 instructs the operator profile of the network to which the baseband processing module 102 attaches to switch to Profile A from Profile X; and after successfully attaching to the network via Profile A, the baseband processing module 102 sends a successful switching feedback message to the connection management module 101 so as to establish the cellular data connection channel. After receiving the successful switching feedback message, the connection management module 101 sends a Profile A activation and usage message to the connection management server module 103 to inform the connection management server module 103 that the baseband processing module has attached to the network via Profile A, the connection management server module 103 records Profile A and sends an activation confirmation message to the connection management module 101 after the network state is switched, and then, communication with the connection management server module is realized.

The connection management system for electronic SIM card terminals may further comprise an operator charging module (not shown in FIG. 1) used to measure the traffic of the terminal application module 104 accessing the application server 105.

The connection management server module 103 is also used to send a traffic application message to the operator charging module before sending the activation confirmation message to the connection management module 101, wherein the operator charging module allocates the first traffic according to the traffic application message and sends an allocation feedback message to the connection management server module 103, and the connection management server module 103 sends the activation confirmation message to the connection management module 101 according to the allocation feedback message.

Namely, only when the traffic is successfully applied by the connection management server module 103, will the activation confirmation message be sent to the connection management module 101. The allocation feedback message is actually used to inform the connection management server module 103 of the allocated first traffic. The first traffic may be a time (such as 12 hours) or a flow (such as 200M).

Figure 2:
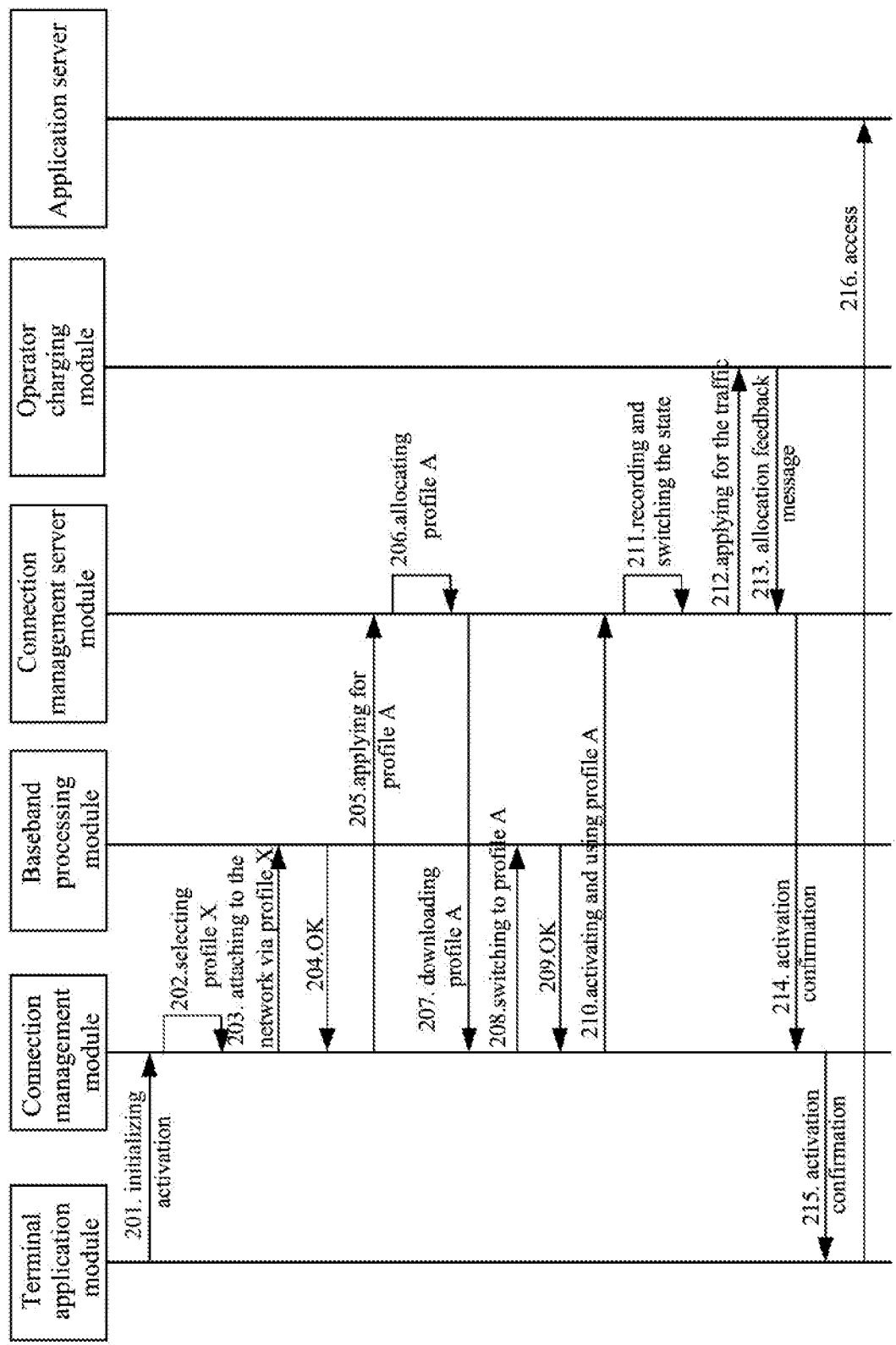
FIG. 2 is a diagram illustrating the message interaction in the connection activating process of the present invention.

FIG. 2 is a diagram illustrating the message interaction in the connection activating process of the present invention. As shown in FIG. 2, the message interaction process for activating the connection is as follows:

201. the terminal application module initializes activation to the connection management module;

202. the connection management module randomly selects one preset operator Profile X from a plurality of pre-stored preset operator profiles and activates Profile X;

203. the connection management module instructs the baseband processing module to attach to the network via Profile X;

204. the baseband processing module attaches to the network via Profile X, opens the data channel and feeds OK back to the connection management module if successfully attaching to the network, and then, and thus the temporary connection channel between the connection management module and the cellular network is established;

205. the connection management module applies for local Profile A from the connection management server via the temporary connection channel according to an application message, wherein the application message contains the position, model, and identification of a terminal;

206. the connection management server module allocates Profile A according to the application message in 205;

207. the connection management module downloads Profile A from the connection management server module through various eSIM download techniques such as SGP.01/02, SGP.21/22, or a private SIM download technique;

208. the connection management module instructs the baseband processing module to switch the operator profile attaching to the network from Profile X to Profile A;

209. after successfully attaching to the network via Profile A, the baseband processing module feeds OK back to the connection management module to indicate that the baseband processing module has successfully attached to the network via Profile A;

210. the connection management module sends the Profile A activation and usage message to the connection management server module to inform the connection management server module that the baseband processing module has attached to the network via Profile A, namely, the connection management modules informs the connection management server module that the network has been attached to by using Profile A;

211. the connection management server module records and performs the network state switches;

212. the connection management server module applies a traffic to the operator charging module;

213. the operator charging module allocates the first traffic and feeds an allocation feedback message to the connection management server module;

214. the connection management server module sends an activation confirmation message to the connection management module;

215. the connection management module feeds the activation confirmation message back to the terminal application module;

216. the terminal application module accesses the application server via the established cellular data connection channel.

The process for the terminal application to access the application server by activating the connection is described above, and a preferred embodiment of the present invention is expounded below.

The connection management server module is also used to switch the network state after receiving the Profile A activation and usage message, and to send the activation confirmation message to the connection management module after switching the network state. The connection management module is also used to download another Profile A if it does not receive the activation confirmation message from the connection management server module within a first preset time after the Profile A activation and usage message is sent to the connection management server module.

As shown in FIG. 2, if the connection management server module does not send the activation confirmation message (214 in FIG. 2) to the connection management module within a first preset time from the beginning of 210, it indicates that the current Profile A is unavailable, and the connection management module downloads another Profile A from the connection management server module.

Those skilled in this field would appreciate that the connection management server module can also send a non-activation confirmation message to the connection management module if the current Profile A is unavailable so that the connection management module can download another Profile A from the connection management server module.

The connection management module is also used to select another Profile X if it does not receive the activation confirmation message from the connection management server module within a second preset time after the connection management module selects Profile X.

As shown in FIG. 2, if the connection management server module does not send the activation confirmation message to the connection management module (214 in FIG. 2) within a second preset time from the beginning of 202, it indicates that the baseband processing module cannot attach to the network via the current Profile X, and the connection management module selects another Profile X.

The connection management module is also used to select another Profile X if it does not receive the feedback message from the baseband processing module within a third preset time after the connection management module selects Profile X.

As shown in FIG. 2, if the baseband processing module does not send the feedback message to the connection management module (204 in FIG. 2) within the third preset time at the beginning of 202, it indicates that the baseband processing module cannot attach to the network via the current Profile X, and the connection management module selects another Profile X.

The operator charging module is also used to send a 'to be used up' notification to the connection management module through the connection management server module under the condition where the difference between the first traffic and the measured traffic consumption is smaller than a preset traffic threshold.

The first traffic can be, for instance, a time and/or a flow, and the preset traffic threshold corresponding to the time is a time threshold and the preset traffic threshold corresponding to the flow is a flow threshold. The time allocated by the operator charging module can be, for instance, 12 hours, and the flow allocated by the operator charging module can be, for instance, 200 M. In this example, assuming that the time threshold is 0.5 hours and the flow threshold is 10M, the operator charging module sends a 'to be used up' notification to the connection management module through the connection management server when the access time reaches 11.5 hours (0.5 hours is left) or the flow of 190M is used (10M is left). Of course, it is also possible that the flow of 190M is used and the access time reaches 11.5 hours.

The connection management module is also used to forward the 'to be used up' notification to the terminal application module so as to apply the second traffic or to activate Profile A according to the usage feedback message from the terminal application module.

Figure 3:
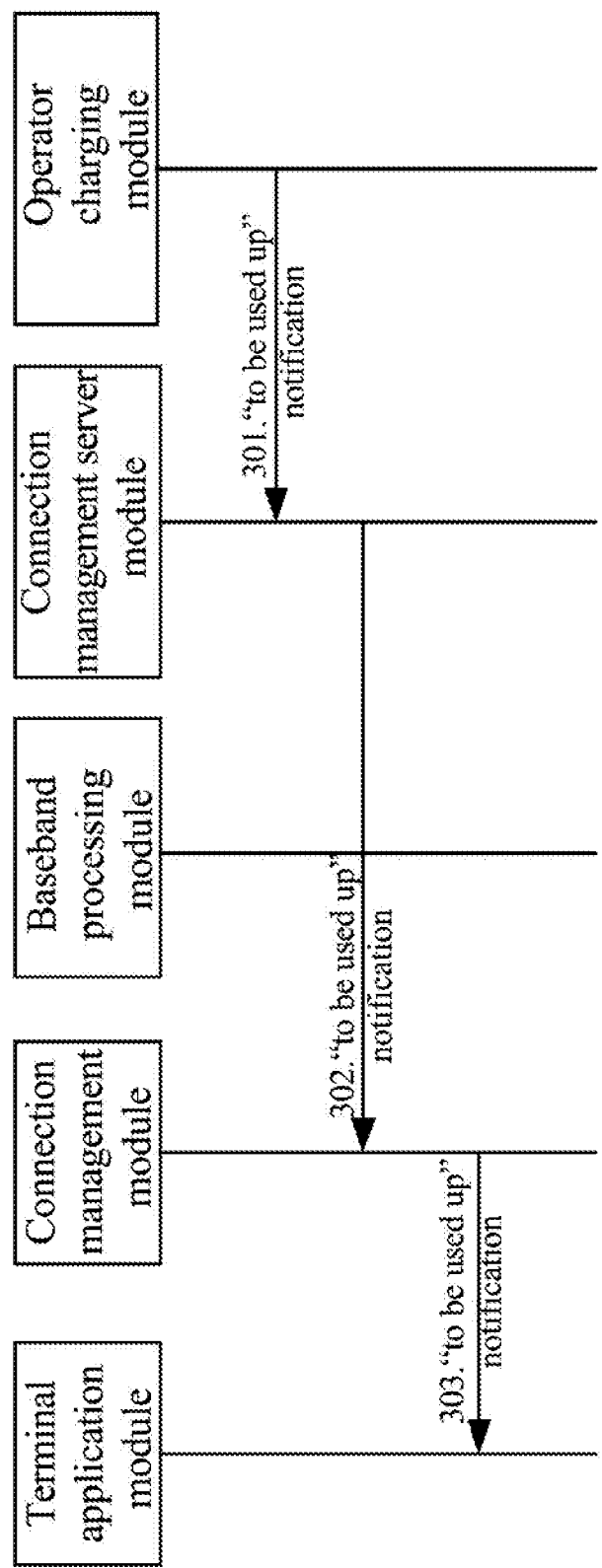
FIG. 3 is a diagram illustrating the transmission of a 'to be used up' notification in the present invention.

FIG. 3 is a diagram illustrating the transmission of the 'to be used up' notification in the present invention. As shown in FIG. 3, the 'to be used up' notification is sent to the connection management server module by the operator charging module (301), then is sent to the connection management module from the connection management server module (302) and is finally sent to the terminal application module from the connection management module (303).

The usage feedback message from the terminal application module may be a 'continue to use' message or a 'usage completion' message, wherein the 'continue to use' message indicates that the terminal application module will continue to access the application server after the first traffic is used up, and the 'usage completion' message indicates that the terminal application module will not need to access the application server.

Figure 4:
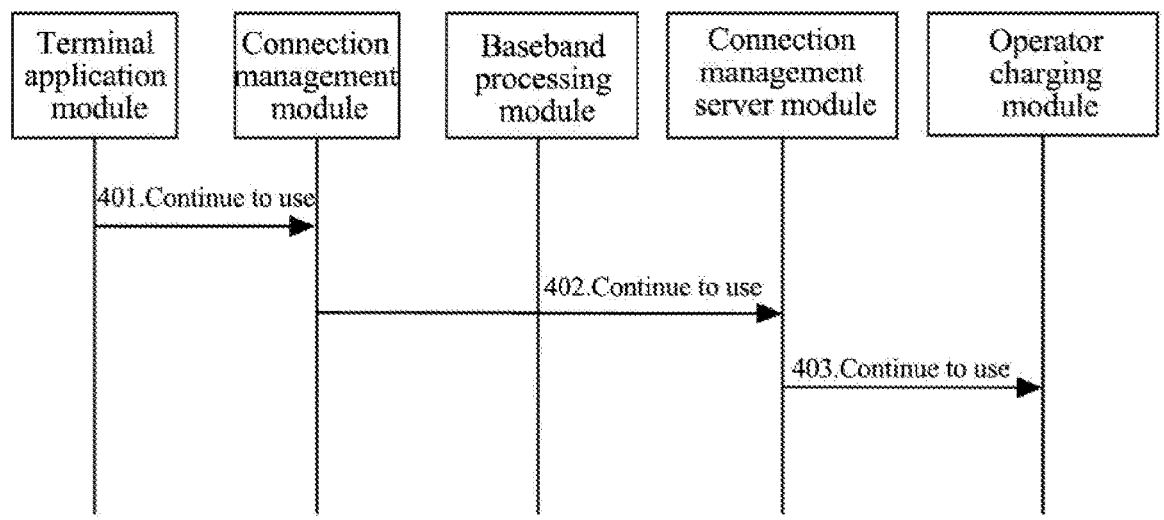
FIG. 4 is a diagram illustrating the transmission of a 'continue to use' message in the present invention.

FIG. 4 is a diagram illustrating the transmission of the 'continue to use' message in the present invention. As shown in FIG. 4, if the terminal application module intends to continue to access the application server after the first traffic is used up, the usage feedback message 'continue to use' is fed back to the connection management module (401), then the connection management module sends the usage feedback message 'continue to use' to the connection management server module (402), and the connection management server module forwards the usage feedback message 'continue to use' to the operator charging module (403) to apply for the second traffic. Those skilled in this field would appreciate that information of the second traffic should be contained in the usage feedback message 'continue to use'. Similar to the first traffic, the second traffic may include a time and/or a flow, and the subsequent process (for instance, how to send the 'to be used up' notification) is similar to that of the first traffic. The time in the second traffic may be identical with or different from that of the first traffic, and the flow in the second traffic may be identical with or different from that of the first traffic.

Figure 5:
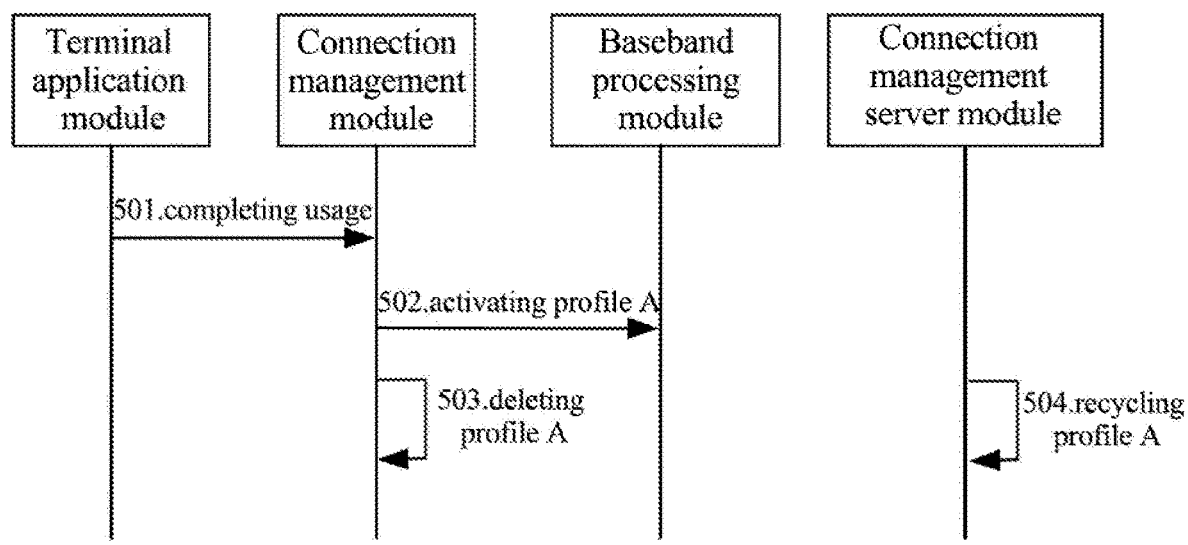
FIG. 5 is a diagram illustrating the transmission of a 'usage completion' message in the present invention.

FIG. 5 is a diagram illustrating the transmission of the 'usage completion' message in the present invention. As shown in FIG. 5, if the terminal application module does not intend to continue to access the application server, the usage feedback message 'usage completion' is sent to the connection management module (501), then the connection management module instructs the baseband processing module to activate Profile A (502), at the same time, the connection management module deletes Profile A (503), and Profile A is recycled by the connection management server module (504) so as to allocate Profile A to other terminals or to use Profile A for other purposes in the subsequent stage.

Furthermore, if the connection management server module does not receive the usage feedback message 'continue to use' sent by the terminal application module through the connection management module within a first preset feedback time after receiving the 'to be used up' notification, the subsequent process is executed in the same way as the 'usage completion' process shown in FIG. 5, and it is regarded that usage is completed.

Similarly, if the connection management module does not receive the usage feedback message 'continue to use' sent by the terminal application module within a preset second feedback time after receiving the 'to be used up' notification, the subsequent process is executed in the same way as the 'usage completion' process shown in FIG. 5, and it is regarded that usage is completed.

What needs to be pointed out is that electronic SIM cards in the present invention include virtual SIM cards and embedded SIM cards (eSIM cards).

Figure 6:
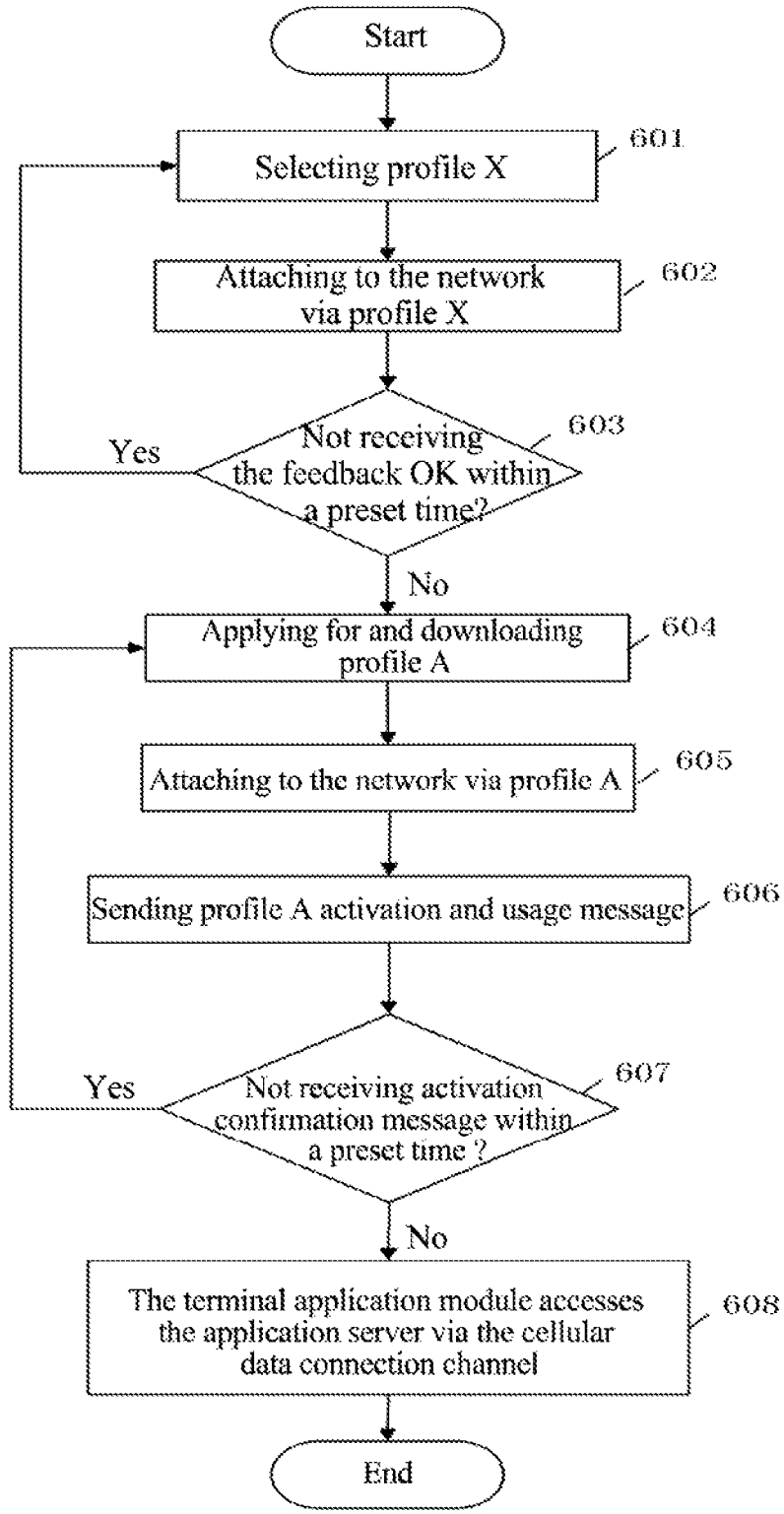
FIG. 6 is a flow diagram of the connection activating process of the present invention.

FIG. 6 is a flow diagram of the connection activating process of the present invention. As shown in FIG. 6, the connection activating process comprises the following steps:

Step 601, the connection management module randomly selects one operator profile, namely Profile X, from a plurality of pre-stored operator profiles and activates Profile X.

Step 602, the baseband processing module attaches to the network via Profile X obtained in step 601.

Step 603, whether a feedback OK is not received overtime is judged. Particularly, the baseband processing module will send the feedback OK to the connection management module to indicate a successful attaching if successfully attaching to the network in step 602 (the temporary connection channel is established); it can be easily understood that the baseband processing module will not feed any message back to the connection management module if not successfully attaching to the network, and in this case, a preset time, namely the second preset time mentioned above, is set; if the connection management module does not receive the feedback OK within the second preset time (after the connection management module selects Profile X as described above), it indicates that the baseband processing module has failed to attach to the network. In step 603, if the feedback OK is not received within the second preset time, step 601 is preformed again to select another Profile X; or if the feedback OK is received within the second preset time, step 604 is performed.

Step 604, the connection management module applies Profile A from the connection management server module and then downloads Profile A from the connection management server module.

Step 605, the baseband processing module attaches to the network via Profile A and sends a feedback message to the connection management module if successfully attaching to the network.

Step 606, if the connection management module receivers the feedback message indicating that the baseband processing module successfully attaches to the network via Profile A, the connection management module sends a Profile A activation and usage message to the connection management server module to inform the connection management server module that the baseband processing module has attached to the network via Profile A, namely the connection management module informs the connection management server module that the network has been attached to via Profile A.

Step 607, whether the activation confirmation message is not received overtime is determined. Particularly, if the connection management server module confirms that Profile A is activated and used, the connection management server module will feed the activation confirmation message back to the connection management module to instruct the terminal application module to access the application server via the cellular data connection channel; if the connection management server module does not feed the activation confirmation message back to the connection management module, it indicates that the terminal application module cannot access the application server via the cellular data connection channel, and in this case, a preset time, namely the first preset time, is set; if the connection management module does not receive the activation confirmation message within the first preset time (after sending the Profile A activation and usage message to the connection management server module as described above), it indicates that the terminal application module cannot access the application server via the cellular data connection channel. In step 607, if the activation confirmation message is not received within the first preset time, step 604 is performed again to apply for another Profile A; or if the activation confirmation message is received within the first preset time, step 608 is performed.

Step 608, the terminal application module accesses the application server via the cellular data connection channel. Step 608 is independently described for making the flow in FIG. 6 clearer, but actually, in step 607, if the connection management server module feeds the activation confirmation message back to the connection management module, it indicates that the terminal application module can access the application server via the cellular data connection channel.

The possible implementation of the embodiments of the present invention is detailed above with reference to the accompanying drawings; however, the embodiments of the present invention are not limited to the details of the above implementation, and various simple transformations of the technical solution of the embodiments can be made without deviating from the technical concept of these embodiments, and all these transformations should also fall within the protection scope of the embodiments of the present invention.

The technical solution provided by the present invention has high consistency, is very practical for terminals, is suitable for both intelligent terminals and low-cost modules, and minimizes modifications and customization on the production line. Services fulfilled by the technical solution of the present invention can be loaded to the terminals through OTA. The technical solution is also suitable for stock terminals, and preset data can be modified and updated.

The services fulfilled by the technical solution of the present invention are available anytime and anywhere as long as the cellular network is available and the terminals are powered on, and can be accessed by terminals as well as applications on a white list of the terminals. These services are suitable for any scenes needing temporary reliable connection, such as unpacking, power-on, anti-theft positioning and mobile payment, and the cost for maintaining the operator profiles is very low.

The services fulfilled by the technical solution of the present invention are activated by terminal applications using these services, and a corresponding fee is paid by the terminal applications using these services.

Correspondingly, the present invention provides a user terminal. The user terminal comprises the connection management system for electronic SIM card terminals. Under the condition that a cellular data connection channel between the user terminal and the cellular network is established through the connection management system for electronic SIM card terminal, all applications on the user terminal can log in to the network via the cellular data connection channel.

Correspondingly, the present invention further provides an application comprising the connection management system for electronic SIM card terminals. Under the condition that a cellular data connection channel between an application and the cellular network is established through the connection management system for electronic SIM card terminals, the application can log in to the network via the cellular data connection channel. Of course, it can be set that only this application can log in to the network and other applications on the user terminal cannot log in to the network; or it can be set that both this application and other applications on the user terminal can log in to the network.

What needs to be additionally pointed out is that these specific technical characteristics in the above specific implementation can be combined in any proper manners without contradictions. In order to avoid unnecessary repetitions, other possible combinations will not be described herein.

Those skilled in this field would appreciate that all or part of the steps of the method are implemented through relevant hardware instructed by a program, wherein the program is stored in a storage medium and includes a plurality of instructions used to instruct a single-chip microcomputer, a chip or a processor to execute all or part of the steps of the method in the embodiments of this application. The storage medium may be a USB flash disk, a mobile hard disk, a read-only memory (ROM), a random access memory (RAM), a disk, a CD or other media capable of storing program codes.

In addition, combinations of different implementations of the embodiments of the present invention can be made without deviating from the spirit of the embodiments of the present invention, and all these combinations should also fall within the protection scope of the present invention.

What is claimed is:

1. A connection management system for electronic SIM card terminals, comprising:
   a connection management module used to randomly select one preset operator Profile X from a plurality of pre-stored preset operator profiles;
   a baseband processing module used to establish a temporary connection channel between the connection management module and a cellular network via the Profile X; and
   a connection management server module, wherein
   the connection management module applies for a local operator Profile A from the connection management server module and downloads the local operator Profile A from the connection management server module via the temporary connection channel;
   the baseband processing module is further used to establish a cellular data connection channel with the cellular network via Profile A,
   the baseband processing module is further used to send a feedback message to the connection management module on the condition that the temporary connection channel is established, and
   the connection management module is further used to select another Profile X if it does not receive the feedback message from the baseband processing module within a third preset time after selecting Profile X.

2. The system according to claim 1, wherein the system further comprises a terminal application module used to access an application server via the cellular data connection channel.

3. The system according to claim 2, wherein the baseband processing module is further used to establish a formal cellular data connection channel with the cellular network via Profile A by the steps of:
   instructing, via the connection management module, the baseband processing module to attach to the network via Profile A after Profile A is downloaded; and
   establishing the cellular data connection channel if the baseband processing module successfully attaches to the network via Profile A;
   wherein, the connection management module is further used to send a Profile A activation and usage message to the connection management server module to inform the connection management server module that the baseband processing module has attached to the network via Profile A.

4. The system according to claim 3, wherein the connection management server module is further used to switch a network state after receiving the Profile A activation and usage message and to send an activation confirmation message to the connection management module after switching the network state;
the connection management module is further used to download another Profile A if it does not receive the activation confirmation message from the connection management server module within a first preset time after sending the Profile A activation and usage message to the connection management server module.

5. The system according to claim 3, wherein the connection management module is further used to select another Profile X if it does not receive an activation confirmation message from the connection management server module within a second preset time after selecting the Profile X.

6. The system according to claim 3, wherein the system further comprises:
an operator charging module used to measure a traffic of the terminal application module accessing the application server.

7. The system according to claim 6, wherein the connection management server module is further used to send a traffic application message to the operator charging module before sending an activation confirmation message to the connection management module;
wherein, the operator charging module allocates a first traffic according to the traffic application message and sends an allocation feedback message to the connection management server module, and the connection management server module sends the activation confirmation message to the connection management module according to the allocation feedback message.

8. The system according to claim 7, wherein the operator charging module is further used to send a 'to be used up' notification to the connection management module via the connection management server when a difference between measured traffic consumption and the first traffic is smaller than a preset traffic threshold.

9. The system according to claim 8, wherein the connection management module is further used to forward the 'to be used up' notification to the terminal application module so as to apply for a second traffic or to activate the Profile A according to a usage feedback message of the terminal application module.

10. The system according to claim 9, wherein the first traffic and the second traffic are time and/or flow.

11. The system according to claim 1, wherein the electronic SIM card includes a virtual SIM card and an embedded SIM card.

12. A user terminal, comprising the connection management system for electronic SIM card terminals according to claim 1.

13. An application, comprising the connection management system for electronic SIM card terminals according to claim 1.

* * * * *